(12) United States Patent
Gschwind

(10) Patent No.: US 7,603,920 B2
(45) Date of Patent: Oct. 20, 2009

(54) LOAD MEASURING DEVICE

(76) Inventor: Franz Xaver Gschwind, Dr.-Ing. Gschwind Elektronik GmbH, Frundsbergstr. 31, München (DE) D-80634

( * ) Notice: Subject to any disclaimer, the term of this patent is extended or adjusted under 35 U.S.C. 154(b) by 0 days.

(21) Appl. No.: 11/538,446

(22) Filed: Oct. 4, 2006

(65) Prior Publication Data

US 2008/0110282 A1    May 15, 2008

(30) Foreign Application Priority Data

Oct. 6, 2005    (DE) .................. 10 2005 047 971

(51) Int. Cl.
*G01L 1/12*    (2006.01)
(52) U.S. Cl. .................... 73/862.69; 73/777
(58) Field of Classification Search .............. 73/862.69, 73/777
See application file for complete search history.

(56) References Cited

U.S. PATENT DOCUMENTS

| | | | | |
|---|---|---|---|---|
| 4,884,223 A * | 11/1989 | Ingle et al. | .................... | 702/41 |
| 5,230,392 A * | 7/1993 | Tremblay | .................... | 177/137 |
| 5,506,764 A * | 4/1996 | Hon et al. | ................ | 363/21.16 |
| 5,568,815 A * | 10/1996 | Raynes et al. | ................ | 600/485 |
| 5,623,128 A * | 4/1997 | Grimm et al. | ............. | 177/25.13 |
| 5,999,168 A * | 12/1999 | Rosenberg et al. | .......... | 345/161 |
| 6,446,202 B1 * | 9/2002 | Krivoshein et al. | ............. | 713/1 |
| 6,589,185 B1 * | 7/2003 | Archibald et al. | ........... | 600/494 |
| 6,999,996 B2 * | 2/2006 | Sunderland | .................. | 709/208 |
| 7,118,534 B2 * | 10/2006 | Ward et al. | .................. | 600/490 |
| 7,472,577 B2 * | 1/2009 | Shibuichi et al. | .................. | 73/9 |
| 2001/0045941 A1 * | 11/2001 | Rosenberg et al. | .......... | 345/161 |
| 2004/0145563 A9 * | 7/2004 | Rosenberg et al. | .......... | 345/156 |
| 2005/0137821 A1 | 6/2005 | Maher et al. | | |
| 2006/0047232 A1 * | 3/2006 | Bourne et al. | .................. | 601/71 |

FOREIGN PATENT DOCUMENTS

DE    2906669 A1    9/1980
DE    29613833 U1    11/1996

* cited by examiner

*Primary Examiner*—Max Noori
(74) *Attorney, Agent, or Firm*—Lowe Hauptman Ham & Berner, LLP

(57) ABSTRACT

A load measuring device, especially load cell, with one or more strain gages preferably connected in form of a bridge circuit, and feed lines for excitation of the strain gage and of the strain gages respectively and for signal derivation, with an integrated analogue/digital converter to convert the analogue measuring signals of the at least one strain gage into a digital signal, and with a bus interface to output the digital signal to a digital bus, the load measuring device comprising an equipment for potential separation between the bus interface and the at least one strain gage.

21 Claims, 3 Drawing Sheets

Figur 2

LOAD MEASURING DEVICE

FIELD OF THE INVENTION

This invention relates to a load measuring device, particularly a load cell, with one or more strain gages preferably connected in the form of a bridge circuit, and feed lines for excitation of the strain gage and of the strain gages respectively and for signal derivation.

BACKGROUND OF THE INVENTION

Load measuring devices are for example used in the form of load cells to examine the weight of an equipment, e.g. of tanks or similar during the usage. A load cell according DE-U-29613833.9 is for this reason equipped within a cavity with strain gages, connected to form a bridge circuit. The strain gages are equipped at the inner surface of an external cover of the cavity. Action of outer force to the cover results as usual known in a measuring signal of the bridge circuit. In the described solution of the state of the art are two strain gages used for the pressure range and two further strain gages for the tension range. At the known solution the analogue measuring signal is fed by bushing filters through an electrical conductive closing plate out of the cavity to an evaluator equipment and there evaluated as an analogue signal.

DE 29 06 669 A1 describes a load measuring device with strain gages, where the strain gages and the evaluator equipment can be used potential-free.

A load measuring device with the features of the preamble of claim 1 is known from US 2005/0137821 A1.

SUMMARY OF THE INVENTION

An object of one or more embodiments of the present invention is to provide a load measuring device which allows the connection to a digital measuring bus, leads to a low interference liability and is easy in use and connection.

The solution of at least a portion of this object is described by one or more features of claim 1.

Especially in accordance with one or more embodiments of the invention, the load measuring device is provided with an integrated analogue/digital converter for converting the analogue measuring signal of the at least one strain gage to a digital signal and has a bus interface to output the digital signal to a digital bus.

It is an object of one or more embodiments of the present invention that the load measuring device can be directly connected to digital bus systems. Therefore, the derivation of an analogue measuring signal is no longer necessary. The integration of the analogue/digital converter and of the bus interface in the load measuring device in accordance with at least some embodiments reduces the cabling expense and the influence of interference signals. Especially also in comparison with solutions, where an external bus interface is connected with an analogue signal output of the load measuring device, the cabling expense in at least some embodiments is reduced significantly in view of prior systems of which the inventor is aware. The assembly and the installation are very simple in at least some embodiments, because only the output of the load measuring device has to be connected with the used bus system. The interference liability is strongly reduced, especially by using digital signals.

An especially advantageous enhancement of the load measuring device within the scope of at least some embodiments of the present invention has a bus interface which is also suitable for feeding the energy for the supply of the at least one strain gage. An external supply of the measuring system is then not necessary.

Especially with the realization of a force measuring cell, especially of a load cell, the load measuring device within the scope of at least some embodiments of the present invention has a housing, in which the strain gages are mounted in a known manner to an inner surface.

The bus interface of the load measuring device within the scope of at least some embodiments of the present invention can for, example, be equipped for a connection with a PROFIBUS, an INTERBUS or a MODBUS. Especially simple and versatile is the use of an actuator/sensor bus (AS-i-Bus), whereas the bus interface of the load measuring device within the scope of at least some embodiments of the present invention includes an AS-Interface (actuator/sensor-Interface, ASI). It is within the purview of the present invention that one can change between different bus protocols.

Especially an AS-Interface bus usually has no connection to the electrical ground and is therefore potential-free. Therefore it is important that the sensor connection is symmetrically with reference to the electrical ground and also a low capacity to the electrical ground is demanded. But for example concerning load cells usually the strain gages are at the inner surface of the grounded housing and are there bonded for example. These constructions can result in high capacities to the electrical ground, which leads to a restriction for the use with a digital measuring bus. Unsymmetrical irradiation leads to a reduced electromagnetic compatibility.

The load measuring device within the scope of the invention is equipped with a electrical isolation or potential separation between the bus interface and the at least one strain gage to reduce for example the interference liability resulting from signal cross talk. To prevent that high capacitances, which can for example occur between the strain gages and the housing of the load measuring device, will have a negative impact to the bus system, an embodiment of the invention comprises the equipment for the potential separation in a way, that the coupling capacitance between the areas which are separated by the potential separation, is less than 15 pF, preferably less than 10 pF. In this way one obtains an effective capacitive decoupling. It is proofed that a negative influence on the bus system by an unsymmetrical irradiation into the bus lines can thus be prevented or reduced.

Especially in an embodiment of the invention when the bus interface also feeds the supply of the at least one strain gage, a special embodiment for potential separation comprises a toroidal core transformer in the supply path for the supply of the at least one strain gage. The small coupling capacitance will be achieved besides other ways by the suitable choice of the core material, e.g. a ferrite core. Other provisions are the suitable choice of the distance of the coils of the transformer from the core, a low capacitance design of the printed-circuit board, on which there are placed the different components, and the selection of a sealing compound with little coupling capacitance for the toroidal core transformer and/or a separate shielding of the primary coil and the secondary coil, whereas also the primary shielding can be connected with a wire of the primary coil and the secondary shielding with a wire of the secondary coil.

A special embodiment achieves a small coupling capacitance among other things by spatially separating the at least one primary coil and the at least secondary coil of the toroidal core transformer in a manner, that the coupling capacitance reaches the wished small amount. For this reason one can wind especially the windings of the separate coils in a concentrative manner on the ring core of the transformer, so that the wires of the separate windings are basically positioned one upon the other and not side by side. These arrangements can be done both on the one hand for the primary coils and on the other hand for the secondary coils.

In a further development within the scope of this invention the primary coil of the toroidal core transformer is electrically shielded in a special way. There are two shields, whereas one comprises a close capacitive coupling with the primary coil and the other a low capacitive coupling with the primary coil. This can for example be achieved by choosing the thickness of the insulating layers between the primary coil and the corresponding shield. A further step for an effective capacitive decoupling is the provision that the second shield, which has a smaller capacitive coupling, is arranged in two parts, whereas the two parts are electroconductively connected. Especially in an advantageous embodiment is one part of the second shielding arranged within the primary winding of the primary coil and the second part outside of the primary winding, especially advantageous also outside of the first shielding.

To further reduce the coupling capacitance, e.g. to values less than 1 pF, one embodiment of the invention keeps the first and the second shielding advantageously on the same potential, so that no electric charge can flow between both shieldings. Thereby are the toroidal core and the secondary coil from the side of the primary coil electrically no more visible, so that the measuring system with at least one strain gage at the secondary side of the toroidal core transformer can be grounded without influencing a digital bus, which is coupled to the primary side if applicable.

For the control of the potential of both shieldings a special embodiment of the invention provides an active shield control.

As a matter of course all described provisions can also be combined.

One preferential embodiment of the invention comprises a digital isolator with a low coupling capacitance, preferentially less than 4 pF, very preferentially less than 2 pF, which transfers the digital measuring signals for example from the analogue/digital converter to the bus interface or to an interconnected microprocessor. Such a digital isolator can vice versa also be used to transfer control signals to the measuring system. For digital isolators can be used for example optocouplers. One embodiment of the invention uses in a very effective manner air-core transformers. This technology uses transformers on chip basis which comprises for example ten times increased velocities with a ten times reduced need of energy at the same time combined with linear transfer functions without reducing the insulation rigidity. An insulation rigidity of for example 5 kV is possible.

A further development within the scope of this invention provides the complete integration of the load measuring device except for the bus interface in one housing. The housing can be hermetically sealed to limit the influence of environmental impact. Furthermore the components of the bus interface itself except for the bus connection are also integrated into the housing in at least some embodiments.

A special embodiment of the load measuring device within the scope of this invention comprises a real time clock together with an equipment for storage of errors. In this way it is ensured that in the case of an error during the operation this error can be chronologically allocated. Also in the case of a claim under guarantee it is possible to evaluate whether the equipment is used beyond admissible parameter ranges or not.

A further special embodiment of the load measuring device within the scope of this invention comprises an equipment for temperature measurement of the sensor environment. With this provision it is possible by means of corresponding software to detect temperature failings of the measuring chain and if necessary to compensate them.

The load measuring device within the scope of this invention may have a microprocessor for controlling purpose. Advantageously the microprocessor has a boot sector by means of which one can execute a programming, e.g. a software update. Especially realizing a load measuring device which is hermetically sealed, a possibility for programming from outside is specially advantageous.

The microprocessor can be provided for example between the bus interface and the equipment for potential separation.

BRIEF DESCRIPTION OF THE DRAWINGS

The invention will be explained in detail on the basis of the enclosed figures, which show schematically special embodiments. Thereby shows FIG. 1 the schematic assembly of one embodiment of a load measuring device within the scope of this invention, FIG. 2 a detail of an equipment for potential separation of an embodiment within the scope of this invention, and FIG. 3 a circuit diagram of one embodiment of a load measuring device within the scope of this invention.

DETAILED DESCRIPTION OF PREFERRED EMBODIMENTS

Figure 1:
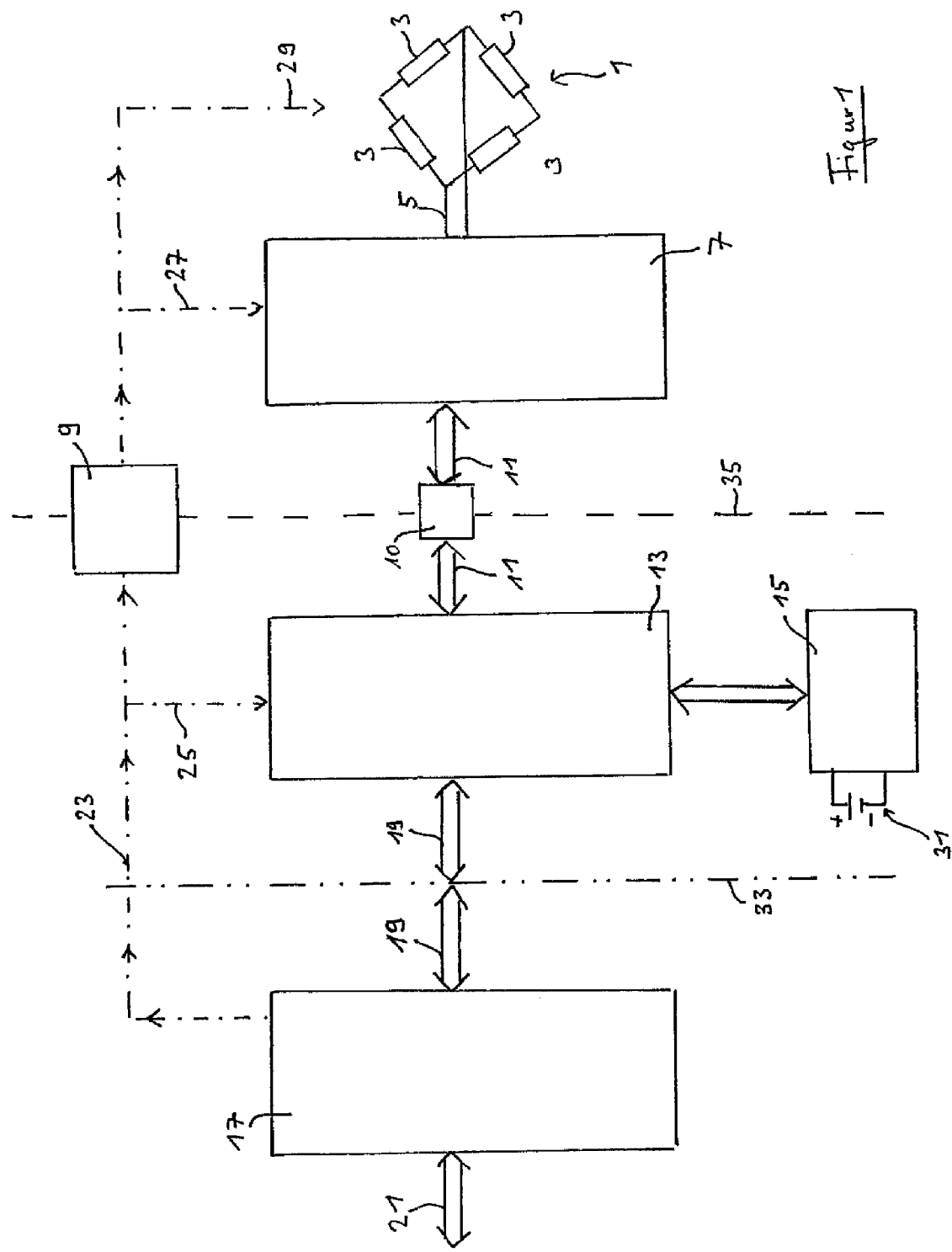

In FIG. 1, the numeral 1 indicates a bridge circuit with four strain gages 3, as realized for example in load cells. Normally two of these strain gages are provided in the pressure environment and two more of the strain gages in the tension environment of the cover of a hermetically sealed housing, which is not shown in the schematic drawing of FIG. 1. Pressure on this cover leads to a change of the resistance, which can be evaluated to indicate the load. Feed line 5 connects the bridge circuit 1 with a processing unit 7, which comprises an analogue/digital converter. Additionally to the analogue/digital conversion the processing unit 7 can also amplify and/or filter the signal. Not shown is an equipment for temperature measuring, which can also be provided within the housing and which signals can be also be transferred in digital form. The digital signals of the measuring bridge 1, the temperature measuring equipment and possibly further sensor equipments are transferred via the signal path 11 to a microprocessor 13.

Otherwise the microprocessor 13, via the signal path 11, transfers control signals to the processing unit 7. So for example a signal of the microprocessor can be used to control a tare equipment which is not shown in the schematic drawing of FIG. 1.

The signal path 11 comprises at least one digital isolator 10 which provides a potential separation. This may be for example an optocoupler which provides an intrinsic potential separation. Especially simple is the use of an air-core transformer, e.g. an iCoupler of Analog Devices Company, especially an iCoupler AduM240x1.

The microprocessor 13 is connected with a real time clock 15 with an error memory, which provides monitoring of the individual actions, to show for example in case of warranty, whether the equipment was used within the range of the admissible parameters, and to provide the possibility for a chronological assignment of the occurred errors. To guarantee the independency of the real time clock, there can be provided a battery backup 31.

The elements provided left of the double-dot chain line 33 in FIG. 1 comprise a bus interface according to an embodiment.

The microprocessor 13 transfers, via path 19, measuring signals to a bus component 17, which can among others also comprise a noise filter and/or a protection circuit against overvoltage. Double arrow 21 marks the bus connection of the bus interface. Especially the use of a AS-Interface device network is suitable, so that the bus interface is provided as AS-Interface.

With other embodiments, the bus component can be switched for connection of different bus systems and different bus protocols respectively.

The load measuring signals can be transmitted for example via a 16 bit value.

From the bus connection 21 or from the bus component 17 supply energy is derived out of the bus signal and supplied via the energy path 23 as electrical supply. A branch 25 provides the supply of the microprocessor 13 with energy. A branch 27 serves for providing possibly necessary energy for the process unit 7, this means especially for the analogue/digital converter, where applicable for the amplification, the tare process, the filtering or for the temperature measuring. Branch 29 symbolizes the supply of the measuring bridge 1 and is understood only schematically to show the energy path. The supply of the measuring bridge 1, for example is provided by the processing unit 7. To ensure the potential separation between bus line and measuring bridge, a DC/DC-converter 9 is provided, which is provided in one embodiment as toroidal core transformer.

The whole arrangement of FIG. 1 except the bus connection 21, can be comprised within one housing, so that a compact and rugged arrangement is guaranteed.

The applied coils of the toroidal core transformer may comprise for example 10 to 20 windings, whereas on the secondary side are two coils and on the primary side three coils. On the secondary side, these coils are connected for two-way rectification and on the primary side for producing an oscillator effect. Also possible are other embodiments of toroidal core transformers with, for example, only one primary coil and only one secondary coil. The primary coil and the secondary coil are spatially separated in a way that the coupling capacity results in less than 10 pF. The primary coil on the one hand and the secondary coil on the other hand may have a special arrangement, to guarantee effectively a spatial separation. For this reason, the windings of the separate coils can be concentrated provided on the toroidal core in a way that the wires of the separate coils are arranged mainly not side by side but one upon the other, so that the distance between the primary and the secondary coil on the toroidal core is as far as possible.

Figure 2:
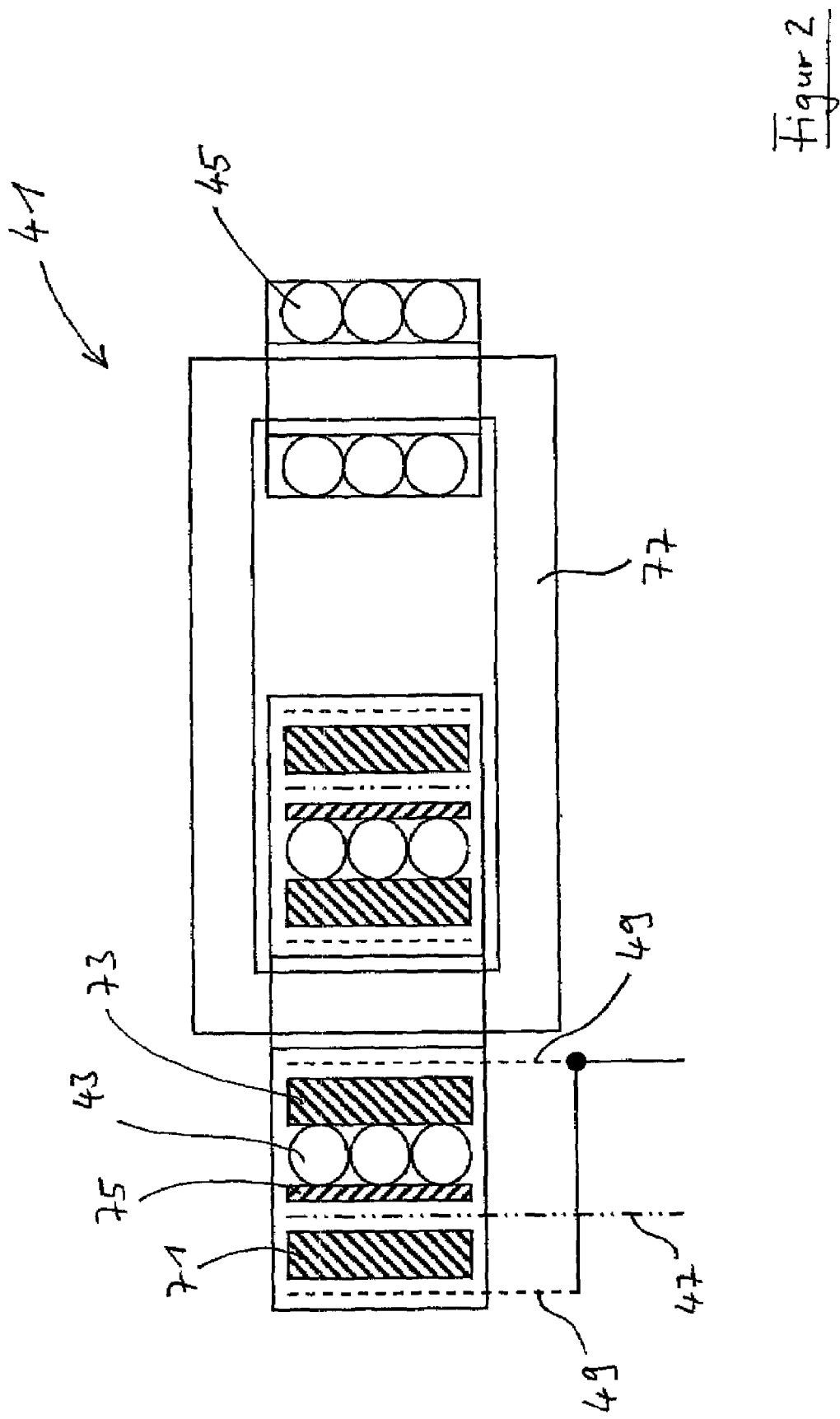

A specially preferred embodiment comprises a toroidal core transformer with a special arrangement of the shielding as shown in FIG. 2. This figure shows the toroidal core transformer 41 in detail. The toroidal core 77 comprises for example a core material with high specific resistance of 100 kOhmmeter, e.g. the core material M13 of Epcos Company. Arranged on that is a secondary winding coil 45, which comprises three windings in the shown embodiment example. The primary coil 43 comprises also three windings, whereas the number of windings can be adopted to the necessary facts. The primary coil 43 is shielded by electrical shieldings 47 and 49, whereas the second shielding 49 is provided two-part. The first shielding 47 is over a thin insulating layer 75 arranged on the primary coil 43 in a way that there results in a narrow capacitive coupling $C_1$. This arrangement is as inside as outside surrounded by thick insulating layers 71 and 73, which are again surrounded by the two parts of the second shielding 49. Therefore has the second shielding 49 a smaller capacitive coupling $C_2$ to the primary coil.

This thin insulation 75 is for example 0.1 mm thick, but comprises an insulation rigidity of for example 5 kV. The shieldings 47, 49 can for example comprise copper foils with insulations that there will not arise a short circuit winding when the foil overlaps.

Figure 3:
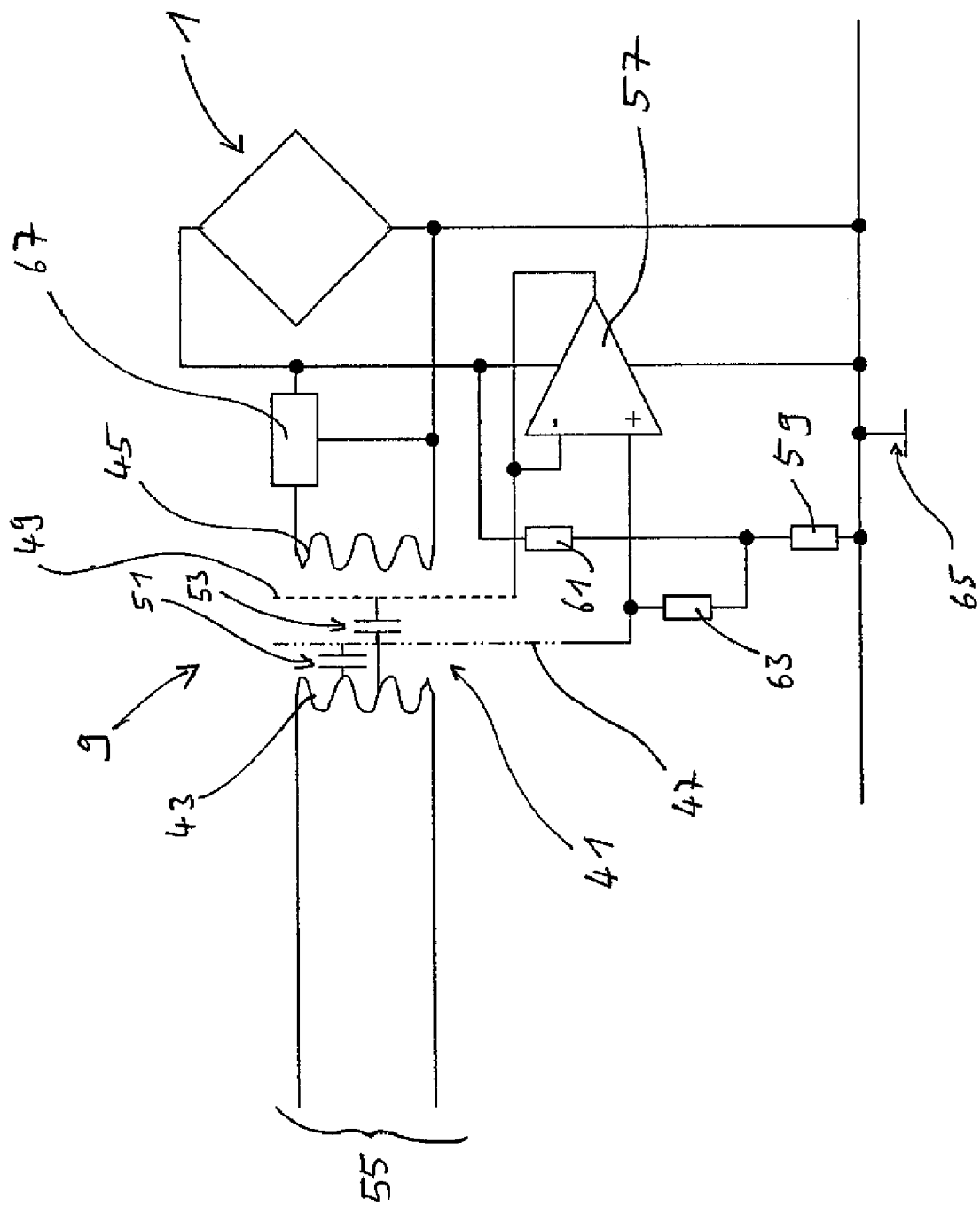

FIG. 3 shows a circuit arrangement of one embodiment of a load measuring device according to the present invention which makes visible how the DC/DC converter 9 is equipped with such a toroidal core transformer 41. One recognizes in particular the primary coil 43, the secondary coil 45 and both shieldings 47 and 49. Numeral 51 denotes the resultant capacitance C1 between the primary coil 43 and the first shielding 47 and numeral 53 denotes the resultant capacitance C2 between the second shielding 49 and the primary coil 43.

The primary coil 43 is connected with the bus line 55, by this way corresponding particularly to part of the primary side of the energy path 23 (FIG. 1). The secondary coil 45 is via a voltage regulator 67 with rectifier connected to the measuring bridge 1, which comprises in described manner strain gages, which are arranged at the inner surface of the cover of a load cell. Especially recognizable is that one connection of the measuring bridge can be grounded, which is implied by the electric ground 65. This grounding possibility is advantageous especially for sensor elements, which have a close coupling with ground due to physical reasons.

The circuit of FIG. 3 comprises an active shielding control. For this is provided an operational amplifier 57, e.g. an operational amplifier AD628 of Analog Devices Company, which is supplied by the secondary side 45 of the toroidal core transformer 41. Should the regulator range of the operational amplifier 57 not be sufficient, the normal provided supply voltage can be increased for example by an additional secondary coil. The voltage divider with the resistances 61 and 59, which for example have the value each 100 kOhm leads the output of the operational amplifier 57 to the half of the supply voltage, so that the output can be driven in positive or negative direction. The first shielding 47 will be kept via a resistance 63 with for example 100 MOhm at the potential of half of the supply voltage. The operational amplifier is provided with a high input resistance and an internal protection circuit against over voltage. Especially by the use of digital isolators for the transfer of the digital measuring signals and digital control signals respectively and by the use of a DC/DC converter 9 in the supply path it is guaranteed, that there is an effective potential separation with small coupling capacity along the imaginary dashed line 35. Possible high capacities of the measuring device comprising strain gages and out of this possibly resulting negative influences by unsymmetrical irradiations will be "faded out" along the imaginary line 35, so that the negative influence on a bus system will be reduced and avoided respectively, which will be connected to the bus connection 21 (FIG. 1) and the bus line 55 (FIG. 3) respectively. This allows in particular the use of an AS-Interface device network.

The microprocessor 13 can be implemented in a way that a special analysis of the measuring signal of the measuring bridge 1 provides a error detection of the strain gages with which one can detect for example a coming off from the underground or a wire breakage. There can be provided a software which determines important parameters of the strain gages 3, e.g. bridge unbalance, characteristic line errors and temperature errors and compensates these errors by software. Further, the measuring signals can be smoothed by software and additional disturbing signals be eliminated. Further on it is possible to report errors of the measuring device and of the environment conditions to the bus master.

Because of the use of internal voltage converters the provided circuit of the load measuring device according to the present invention is suitable for network-independent battery supply for any place of use. For this purpose it is possible to switch the microprocessor into a power saving mode by software.

The software can also be organized in a way which allows an interval operation so that for example only one measuring value per hour is evaluated, and that these measuring values will be later time corresponding read out. This is especially advantageous with battery supply because of reduced energy expense. The microprocessor comprises a boot sector which allows at any time a software update from outside. This is especially advantageous since for example load cells are sealed hermetically.

The invention provides the integration of a digital interface especially an AS-Interface within a load cell. The digital interface allows the direct connection to separate strain gages or to strain gages bridge circuits. Special embodiments guarantee a small coupling capacitances between bus system and measuring device so that a high electromagnetic compatibility (EMC) is guaranteed. By "complete fading out" of the ground it is possible to run a measuring device at a digital bus, even when the measuring device has a strong galvanic or capacitive connection with the housing or the ground and therefore not being suited for the bus operation or only with high expense. This is especially important with load measuring devices and load cells respectively, which are provided with strain gages which are attached to the inner surface of the cover or housing of load cell which is grounded.

The term "load measuring device" which is used in this context comprises especially pressure measuring cells, force measuring cells and load cells. These serve for example to monitor the weight of tanks or of reinforcements in the scope of civil engineering or of components of mechanical engineering. Adequate provided load measuring devices according to the present invention are also suitable as sensors for safety engineering, e.g. as emergency stop switches and/or for safety doors, if applicable for example up to the category 4 of the norm DIN EN954-1.

REFERENCE SIGN LIST 1 strain gage measuring bridge
3 strain gages
5 electrical feed line
7 processing unit, comprising an A/D-converter
9 DC/DC-converter
10 air-coil transformer
13 microprocessor
15 real time clock
17 bus component
19 signal path
21 bus connection
23 energy path
25,27,29 branch from energy path
31 battery back up
33 bus interface boundary
35 potential separation line
41 toroidal core transformer
43 primary coil
45 secondary coil
47 first shielding
49 second shielding
51 capacity C1
53 capacity C2
55 bus line
57 operational amplifier
59 resistance
61 resistance
63 resistance
65 electrical ground
67 voltage regulator with rectification
71,73,75 insulation layer
77 toroidal core While the invention has been described with reference to various embodiments, it will be understood that these embodiments are illustrative and that the scope of the invention is not limited to them. Many variations, modifications, additions and improvements of the embodiment described are possible.

What is claimed is:

1. A load measuring device, comprising:
    at least one strain gage;
    a processing unit connected to the at least one strain gage and arranged to generate a digital signal responsive to receipt of a measurement signal from the at least one strain gage;
    a bus interface coupled with the processing unit and arranged to connect with a bus and to transmit the digital signal to the bus; and
    potential separation equipment connected between the bus interface and the at least one strain gage for electrically isolating the at least one strain gage from the bus interface.

2. A load measuring device according to claim 1, wherein the bus interface is an actuator/sensor (AS)-Interface arranged to connect to an AS-Interface device network.

3. A load measuring device according to one of claims 1 or 2, wherein the bus interface is arranged to supply energy to the at least one strain gage.

4. A load measuring device according to claim 1, wherein:
    the potential separation equipment comprises a DC/DC converter.

5. A load measuring device according to claim 4, wherein: the DC/DC converter comprises a toroidal core transformer with at least one primary coil and at least one secondary coil, where preferably the at least one primary coil and the at least one secondary coil are spatially separated in a way that the coupling capacity results in less than 15 pF.

6. A load measuring device according to claim 5, wherein: the primary coil of the toroidal core transformer comprises at least two shieldings, arranged in a way that a first shielding has a strong capacitive coupling with the primary coil and the second shielding has a small capacitive coupling with the primary coil, which is smaller than the capacitive coupling of the first shielding with the primary coil.

7. A load measuring device according to claim 6, wherein: the second shielding comprises two parts, which are electrically connected to each other and whereas the first part is arranged within the winding of the primary coil and the second part is arranged outside of the winding of the primary coil, preferably outside of the first shielding.

8. A load measuring device according to one of claims 6 or 7, wherein:
    the first shielding and the second shielding each have the same electrical potential.

9. A load measuring device according to one of claims 6, 7, further comprising:
    an electric circuit connected to the first shielding and the second shielding and arranged to provide active control of the first and second shieldings.

10. A load measuring device according to claim 1, further comprising:
for the transfer of the digital signals to/from the bus interface, at least one digital isolator with coupling capacity, less than 4 pF.

11. A load measuring device according to claim 10, wherein:
the at least one digital isolator is an air-coil transformer.

12. A load measuring device according to claim 1, further comprising a real time clock with an error memory.

13. A load measuring device according to claim 1, further comprising a temperature measuring equipment.

14. A load measuring device according to claim 1, further comprising a microprocessor connected between the processing unit and the bus interface and arranged to perform signal processing.

15. A load measuring device according to claim 1, wherein the at least one strain gage is provided at the inner surface of a housing.

16. A load measuring device according to claim 1, further comprising a bridge circuit comprising at least the at least one strain gage and the bridge circuit connected to the processing unit and the potential separation equipment.

17. A load measuring device according to claim 4, wherein the DC/DC converter has a coupling capacity of less than 15 pF.

18. A load measuring device according to claim 4, wherein the DC/DC converter has a coupling capacity of less than 10 pF.

19. A load measuring device according to claim 10, wherein the at least one digital isolator has a coupling capacity of less than 2 pF.

20. A load measuring device according to claim 1, wherein the processing unit is electrically connected with the at least one strain gage and the bus interface is electrically connected with the processing unit.

21. A load measuring device, comprising:
one or more strain gages;
a processing unit connected to the one or more strain gages and arranged to convert a received analogue measurement signal from the one or more strain gages into a digital measurement signal;
a bus interface connected to the processing unit and arranged to transmit the digital measurement signal and arranged to supply energy to the one or more strain gages; and
an electrical isolator connected between the bus interface and the one or more strain gages and arranged to separate the electric potential of the bus interface from the electric potential of the one or more strain gages.

* * * * *